United States Patent [19]
Lesneski

[11] Patent Number: 5,316,458
[45] Date of Patent: May 31, 1994

[54] HYDRAULIC TIRE CURING PRESS
[75] Inventor: Bernard F. Lesneski, Akron, Ohio
[73] Assignee: McNeil Akron, Inc., Akron, Ohio
[21] Appl. No.: 648,187
[22] Filed: Jan. 31, 1991
[51] Int. Cl.$^5$ .............................................. B29C 35/02
[52] U.S. Cl. ..................................... 425/34.1; 425/47; 425/451.9
[58] Field of Search ............... 425/28.1, 35, 47, 36, 425/450.1, 400, 390, 150, 151, 153, 408, 451, 34.1, 451.9, 451.2

[56] References Cited
U.S. PATENT DOCUMENTS

| | | | |
|---|---|---|---|
| 2,916,768 | 12/1959 | Quere et al. | 425/451.9 |
| 3,315,311 | 4/1967 | Fike | 425/47 |
| 3,870,443 | 3/1975 | Schatz | 425/28 |
| 3,920,364 | 11/1975 | Cadogan-Rawlinson et al. | 425/450.1 |
| 4,106,885 | 8/1978 | Poncet | 425/450.1 |
| 4,130,384 | 12/1978 | MacMillan | 425/451.2 |
| 4,191,523 | 3/1980 | Niederst et al. | 425/450.1 |
| 4,245,971 | 1/1981 | MacMillan | 425/451.9 |
| 4,304,540 | 12/1981 | Hammon | 425/150 |
| 4,332,536 | 6/1982 | Singh et al. | 425/33 |
| 4,379,104 | 4/1983 | Koorevaar | 425/34.1 |
| 4,383,808 | 5/1983 | Kubo et al. | 425/47 |
| 4,448,575 | 5/1984 | Hanyu et al. | 425/47 |
| 4,453,902 | 6/1984 | Imbert | 425/47 |
| 4,484,874 | 11/1984 | Okawachi | 425/47 |
| 4,484,875 | 11/1984 | Irie et al. | 425/47 |
| 4,504,208 | 3/1985 | Kurumaji et al. | 425/595 |
| 4,594,067 | 6/1986 | Langos | 425/451.9 |
| 4,631,014 | 12/1986 | Drewel et al. | 425/451.9 |
| 4,647,273 | 3/1987 | Singh et al. | 425/34 |
| 4,669,964 | 6/1987 | Amano et al. | 425/34 |
| 4,674,965 | 6/1987 | Hasegawa et al. | 425/29 |
| 4,686,129 | 8/1987 | Yokoyama et al. | 425/47 |
| 4,695,234 | 9/1987 | Amano et al. | 425/23 |
| 4,698,002 | 10/1987 | Grotkasten | 425/28 |
| 4,698,003 | 10/1987 | Singh | 425/52 |
| 4,744,739 | 5/1988 | Singh | 425/34.1 |
| 4,747,765 | 5/1988 | Siegenthaler et al. | 425/42 |
| 4,768,937 | 9/1988 | Singh | 425/36 |
| 4,804,318 | 2/1989 | Fujieda et al. | 425/34.1 |
| 4,813,861 | 3/1989 | Hasegawa et al. | 425/28.1 |
| 4,822,266 | 4/1989 | Amano et al. | 425/34.1 |
| 4,842,506 | 6/1989 | Coutier | 425/450.1 |
| 4,927,343 | 5/1990 | Amano et al. | 425/34.1 |

FOREIGN PATENT DOCUMENTS

| | | | |
|---|---|---|---|
| 209413 | 1/1987 | European Pat. Off. | 425/451.9 |
| 2142997 | 3/1973 | Fed. Rep. of Germany | 425/451.9 |
| 62-222809 | 9/1987 | Japan | 425/450.1 |

Primary Examiner—Jay H. Woo
Assistant Examiner—James P. Mackey
Attorney, Agent, or Firm—Renner, Kenner, Greive, Bobak, Taylor & Weber

[57] ABSTRACT

A tire curing press (20) according to the concepts of the present invention includes a pair of spaced mold cavities (MC), base assemblies (22, 23) for supporting lower mold sections (L) in the mold cavities, a cross beam assembly (100) for supporting upper mold sections (U) in the mold cavities, a center post assembly (201) substantially aligned between the centerline of the mold cavities, and a lift mechanism (215) positioned interiorly of the center post assembly for supporting and vertically moving the cross beam assembly to open and close the press. A roller guide assembly (230) is provided for stabilizing and effecting precision vertical movement of the cross beam assembly relative to the center post assembly, while a safety stop mechanism (275) precludes uncontrolled descent of the cross beam assembly from the press open position. A mold locking and clamping assembly (120) locks the mold section (L, U) and applies squeeze forces thereto when the press is closed for curing a tire.

15 Claims, 8 Drawing Sheets

HYDRAULIC TIRE CURING PRESS

TECHNICAL FIELD

The present invention relates generally to presses for the shaping and curing of pneumatic tires. More particularly, the present invention relates to a hydraulically actuated tire curing press. More specifically, the present invention relates to a tire curing press which is arranged and operates to meet the strict accuracy requirements of the industry while eliminating or minimizing various of the complexities and drawbacks of mechanical and existing hydraulic presses.

BACKGROUND ART

It was for many years, and remains to some extent, the practice in the tire curing art to counter the extreme forces created by the introduction of high pressure fluids interiorly of a tire located within mold sections positioned in a press by the use of heavy mechanical components in the design of tire curing presses. The most successful and commonly employed mechanical designs have included base and cross beam elements of heavy steel, with reinforcing designed to minimize the deflection produced by the forces and moments developed during pressure loading of the press. The closing of the mold sections effected by movement of the cross beam and the application of sufficient squeeze or closing force to maintain the mold sections closed during the curing operation was normally produced by toggle mechanisms consisting of bull gears and trunion mounting side links which are attached to the cross beam by second trunions. Further, large side plates have been employed to control the movement of the second trunions in selectively located cam slots therein to dictate the path and orientation of the cross beam involved in its travel between closed and opened positions of the press.

Besides the size and complexity of the drive mechanisms for conventional mechanical tire curing presses, the interrelation of the conventional components has resulted in presses of extremely large size and weight, particularly in curing presses which are designed to accommodate larger tire sizes. The size, weight, and complexity of mechanical tire curing presses also translates into very high manufacturing, transportation, and installation costs. Nor have conventional mechanical curing presses been designed in a manner to reduce operating costs as by providing additional insulating material or other modifications to reduce energy inefficiencies which were long tolerated in regard to tire curing presses.

While it has been recognized for some years that hydraulically actuated presses could provide some significant advantages as contrasted with conventional mechanical operation, particularly in the context of a simple vertically opening press, a number of serious deterrents have been encountered in efforts to develop fully acceptable hydraulically actuated tire curing presses. As a result, a great number of different hydraulic actuated tire curing presses have evolved, with the various types exhibiting different advantages and disadvantages. One type of hydraulic tire curing press has employed a generally rectangular frame with a cross beam carrying the upper mold sections being positioned therein and movable by hydraulic cylinders interposed between the top frame member and the cross beam mounting the upper mold sections. In some instances, the opening and closing of the mold and the mold clamping mechanisms have been effected by the same hydraulic actuation devices. In other instances, hydraulic cylinders are employed for vertically moving of the cross beam to open and close the mold while clamping pressure is provided by other hydraulic actuators. In presses of this type, it is common to employ interlocking elements associated with the upper and lower mold sections or elements associated therewith to effect a locking engagement precluding press opening in the event of hydraulic pressure failure and during the operating cycle. In this respect, a wide variety of bayonet-type locking mechanisms of varying complexity and expense have been developed. In this type of hydraulic press, there are normally a plurality of additional cylinders located for operation on the molds to effect the requisite squeeze pressure to withstand the internal pressures encountered during the tire curing operation. Numerous arrangements and operational features of squeeze cylinder assemblies have developed which involve normally a balancing of advantages and disadvantages.

In lieu of bayonet locking assemblies, in some instances, strain rod locking assemblies have been employed which effect a positive locking irrespective of possible failure of hydraulic pressure supply to the press during the curing operation.

In other instances, efforts have been made to eliminate a basic rectangular frame construction and suspend one or more mold sections from one or more upstanding beams with an upfold section lifting cylinders coupled with suitable locking means and separate hydraulic elements for applying squeeze forces to the mold sections. While attractive in the elimination of portions of a press frame, arrangements of this type may be subject to inaccuracies in regard to registration between the mold sections and the complexity of the elements necessary to effect the accuracies which are currently required in the industry.

While most of the operational requirements for a tire curing press can be achieved by a hydraulically actuated press design, it is difficult in many instances to solve some extent problems without reverting to the size, weight, and complexity considerations comparable to those encountered with conventional mechanical presses while still accommodating the disadvantages of a sophisticated hydraulically operated device in a rubber processing facility.

DISCLOSURE OF THE INVENTION

Therefore, an object of the present invention is to provide a hydraulic tire curing press which achieves a size envelope substantially less than conventional mechanical designs while satisfying industry requirements for press performance and cost. Another object of the invention is to provide a tire curing press in which even stringent mold support deflection limitations may be technically and economically achieved to realize substantially uniform mold loading conditions. A further object of the invention is to provide such a press in which the overall design is particularly adaptable to a dual press configuration having two mold cavities to optimize production capability as a function of floor space.

Another object of the present invention is to provide a unique hydraulic tire curing press configuration wherein a single assembly effects mold locking and the application of squeeze forces thereto. Yet another object of the invention is to provide such a press wherein the lock rings for each of the mold cavities are simultaneously actuated by a lock ring actuating assembly. Still another object of the invention is to provide such a press wherein the critical load clamping elements are in compression and are of such a configuration such that they do not possess areas of high stress concentration. Still another object of the present invention is to provide such a press wherein the mold squeeze forces are supplied from a plurality of circumferential locations by beam loading techniques to a bottom load plate and the cross beam and thence through loading pads to spaced circumferential locations above and below the mold sections. Still another object of the invention is to provide such a press wherein each of the clamping cylinders applies equalized clamping forces at two positions spaced peripherally about a mold section to thus improve the distribution of squeeze forces to the mold sections. Still another object of the invention is to provide such a press having a bottom load plate which is adjustable on three axes at the support points of the press frame.

A still further object of the present invention is to provide a hydraulic press wherein the cross beam carrying the upper mold sections is effected by a single vertical guide assembly. Another object of the invention is to provide such a press wherein the vertical guide assembly has a lift mechanism positioned in center post which is located between the mold cavities and in alignment with the centerline thereof. Still another object of the invention is to provide such a press wherein the center post assembly is located at the center of gravity of the cross beam and upper mold section structure irrespective of the size of mold being employed in the press. Another object of the invention is to provide such a press in which the cross beam mounts rollers which engage machine surfaces on four sides of the center post assembly to effect accurate rolling contact defining the movement of the cross beam relative to the center post assembly. Still another object of the invention is to provide such a press wherein certain of the rollers are adjustable to effect highly accurate positioning of the cross beam rollers relative to the center post assembly for accurate repeated displacement of the upper mold sections of the mold cavities in precise registry with the lower mold sections.

Another object of the invention is to provide a hydraulic press having a safety stop mechanism for maintaining the cross beam in the press open position upon failure of the lift mechanism. Yet another object of the invention is to provide such a press having a cross beam locking mechanism embodying stop bars which mechanically preclude press closure and which are mechanically actuated to the locking position. Still another object of the invention is to provide such a press wherein the locking mechanism has a cylinder and cam assembly to selectively retract the stop bars from the locking position preparatory to lowering the cross beam of the press. Still a further object of the invention is to provide such a press in which a sensing mechanism is employed to provide an indication of the vertical location of the cross beam at selected times during the course of its movement relative to the center post.

Yet another object of the present invention is to provide a hydraulic press having the aforedescribed features, yet possessing the flexibility of accommodating a normal range of mold sizes. Still a further object of the invention is to provide such a press having the capability of accommodating conventional molds of two- or three-piece construction mounted on the various types of conventional platens and employing conventional bolsters and insulation to minimize heat loss considerations.

In general, tire curing press according to the concepts of the present invention includes a pair of spaced mold cavities, base assemblies for supporting lower mold sections in the mold cavities, a cross beam assembly for supporting upper mold sections in the mold cavities, a center post assembly substantially aligned between the centerline of the mold cavities, and a lift mechanism positioned interiorly of the center post assembly for supporting and vertically moving the cross beam assembly to open and close the press. A roller guide assembly is provided for stabilizing and effecting precision vertical movement of the cross beam assembly relative to the center post assembly, while a safety stop mechanism precludes uncontrolled descent of the cross beam assembly from the press open position. A mold locking and clamping assembly locks the mold section and applies squeeze forces thereto when the press is closed for curing a tire.

PREFERRED EMBODIMENT FOR CARRYING OUT THE INVENTION

Figure 1:
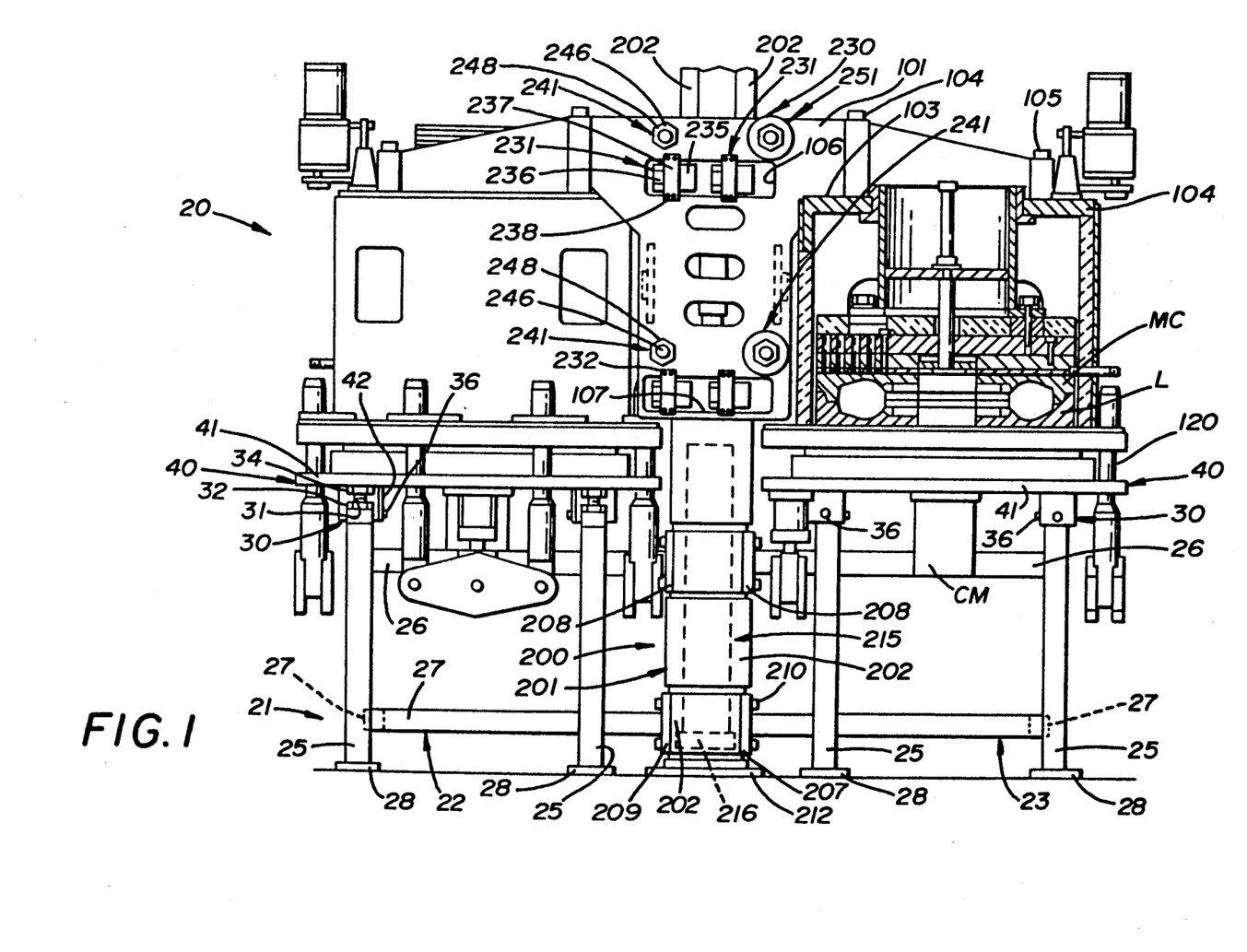
FIG. 1 is a front elevational view of a tire curing press according to the concepts of the present invention showing a dual cavity press configuration with portions of one cavity being shown in section.

In the form of the invention illustrated herein, a dual cavity tire curing press, generally indicated by the numeral 20, is depicted in an overall context in FIG. 1 of the drawings. As shown, the press 20 is adapted for positioning on a floor or alternatively in a pit prepared for purposes of accommodating a portion of the lower extremities of press 20, depending upon press size, the facility in which it might be installed, and related considerations. As seen in FIG. 1 of the drawings, the press 20 has a framework generally indicated by the numeral 21. The framework 21 may take varying forms but is conveniently constructed of two spaced rectangular base assemblies, generally indicated by the numerals 22 and 23, positioned to the left-hand and right-hand sides of the press 20, as viewed from the front in FIG. 1 of the drawings. The base assemblies 22, 23 may be identical and constituted of a plurality of tubular members forming a generally rectangular configuration consisting of four upright corner struts 25 (see FIGS. 1 and 2) interconnected by upper and lower cross braces 26 and 27, respectively, extending from each of the corner struts 25 to rectangularly adjacent corner struts 25. Each of the corner struts 25 may be provided with floor engaging pads 28 which may be of greater crosssectional area than the corner struts 25 for purposes of effecting stable seating on the floor of a tire manufacturing facility or in the bottom of a pit constructed therein.

Located atop each of the corner struts 25 of base assemblies 22, 23 are position adjustment assemblies, generally indicated by the numeral 30, which provide variable positioning about three axes. The position adjustment assemblies 30, as best seen in detail in FIG. 3, include a screw 31 which threadably engages with and extends axially upwardly of the corner struts 25. The axial adjustment of the screws 31 is locked at any desired position by a nut 32 which threadably engages adjustment screws 31 for purposes of maintaining the axial position of the screw head 34.

Figure 2:
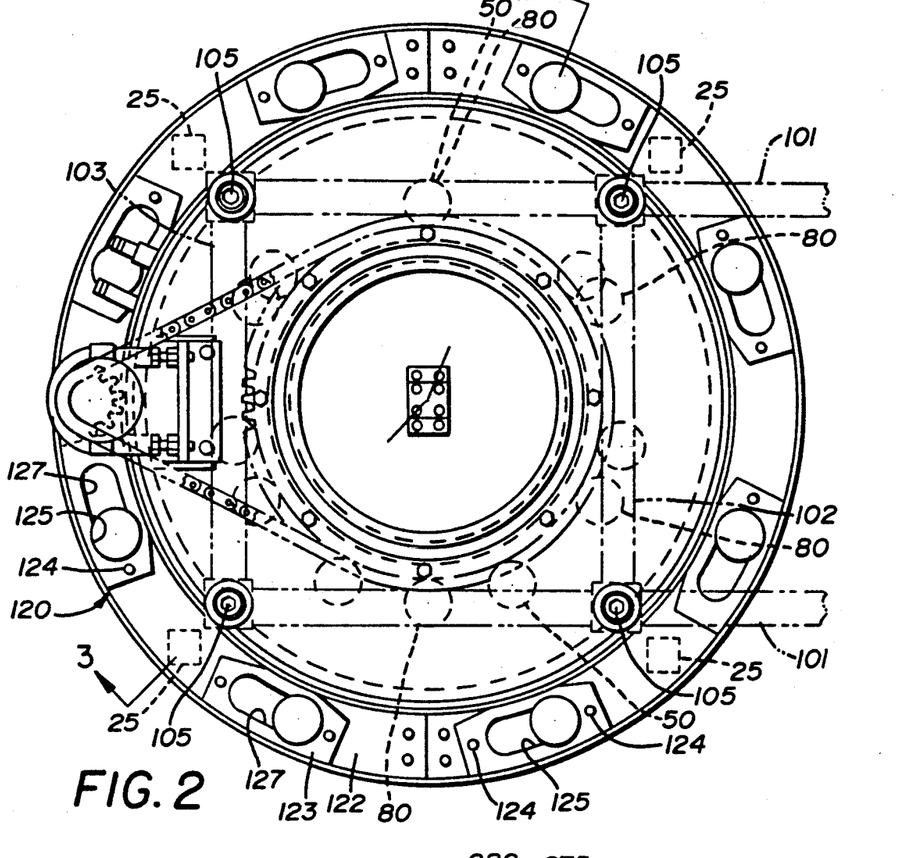
FIG. 2 is a fragmentary top plan view of the tire curing press of FIG. 1 showing principally the left-hand platen assembly of the press as seen in FIG. 1.

Positioned atop the head 34 of screw 31 of position adjustment assembly 30 are bottom load plates, generally indicated by the numeral 40. As seen, each of the bottom load plates 40 consists of an annular plate 41 which surrounds the center mechanism CM of press 20 located radially centrally of the mold cavities MC located to each side of the dual cavity press 20. The center mechanism CM may be any of a variety of types, most of which possess a bladder member to assist in positioning and shaping an uncured tire, as will be appreciated by persons skilled in the art. Projecting downwardly from the annular plates 41 are four housings 42 which are positioned to seat preferably substantially medially thereof the heads 34 of the adjustment screws 31 of the position adjustment assemblies 30. It will thus be appreciated that precise vertical positioning and leveling of plates 41 can be effected by adjustment of the vertical position of the four underlying screw heads 34. The plates 41 may be attached to the underlying screw heads 34 as by cap screws 35. Bidirectional adjustment of each plate 41 relative to struts 25 in a horizontal plane may be effected by cap screws 36 which are inserted through the housing 42 and engage the corner struts 25. Each of the housings 42 supporting each of the plates 41 have a pair of cap screws 36 displaced at approximately right angles, as shown in FIGS. 1 and 2 of the drawings. This permits an extent of bidirectional adjustment in a horizontal plane of each bottom load plate 40 relative to its underlying base assembly 22, 23.

Figure 3:
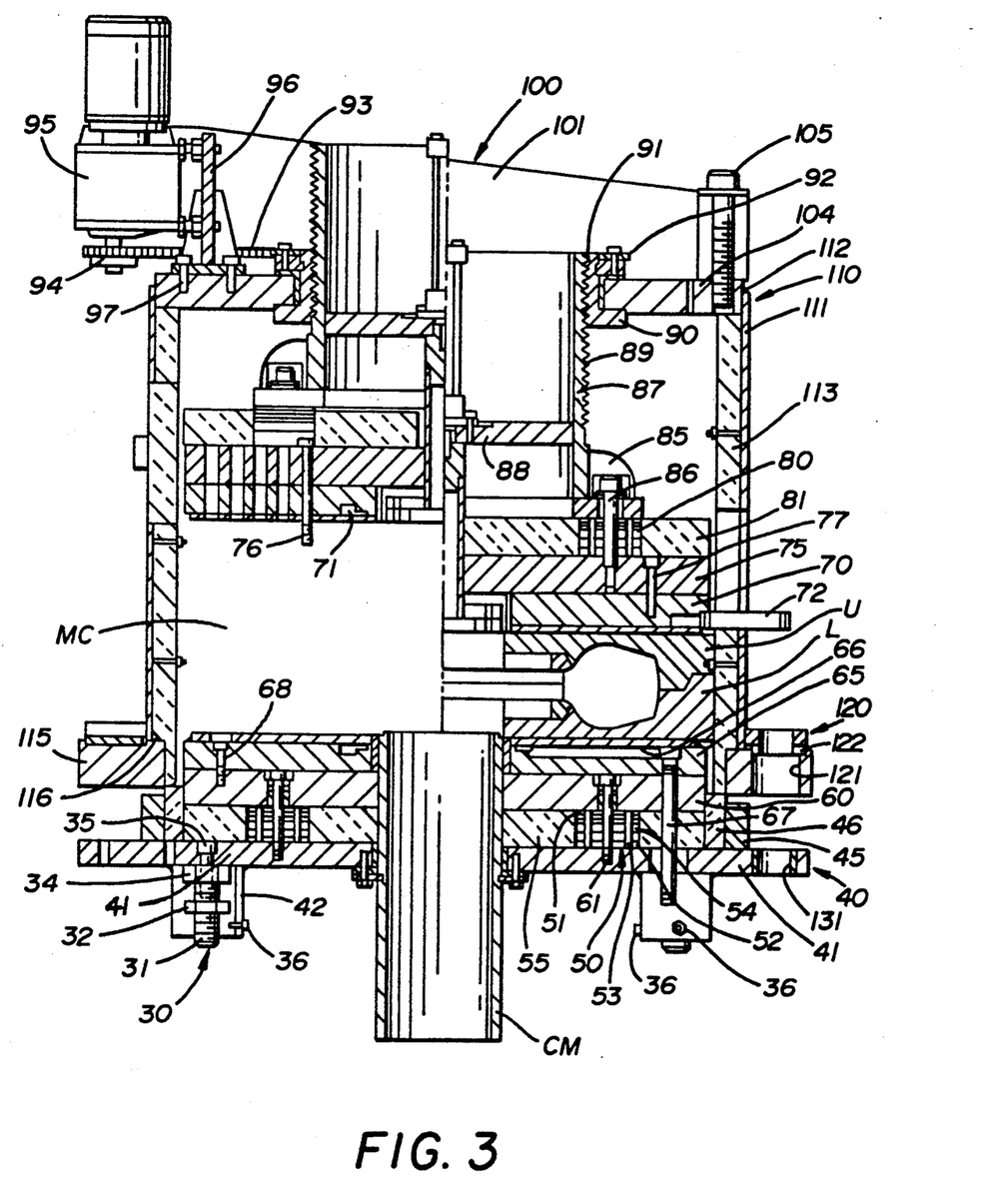
FIG. 3. is a fragmentary sectional view taken substantially along the line 3—3 of FIG. 2 showing details of the left-hand platen assembly of the press, with the positioning shown to the left of the centerline for a maximum height mold and to the right of the centerline for a minimum height mold.

Each of the bottom load plates 40 has an annular reinforcing rail 45 positioned proximate the outer radial extremities of the plates 41, as seen at the right side of FIG. 3, for imparting additional structural rigidity thereto. An insulation set 46 is positioned above plates 41 just radially inwardly of the reinforcing rails 45 and preferably extending slightly axially above the rails 45. The function of the rail 45 and insulation 46 will become apparent from subsequent discussion herein.

The bottom load plates 40 mount the lower mold sections L of each mold cavity MC of the press 20. Adjacent to the plates 41 of bottom load plates 40 are a plurality of lower load pads, generally indicated by the numeral 50, for transferring force to the lower mold sections L from the bottom load plates 40. The load pads 50 may be provided with a rigid top disk 51 and a rigid bottom disk 52 interconnected by screws 53. An insulation stack 54 may advantageously be interposed between the disks 51 and 52. The load pads 50 may advantageously be preloaded prior to machining and assembly. An insulation set 55 may be provided radially inwardly and outwardly of the load pads 50 between the center mechanism CM and the insulation set 46 positioned about the load pads 50.

In the form of the invention depicted, it is contemplated that eight load pads 50 be equiangularly located about the circumference of the center mechanism CM at identical radii substantially as shown for the two load pads 50 depicted in FIG. 3 of the drawings. As shown, the radial location of load pads 50 relative to the center mechanism CM is such as to effect their position substantially radially medially of the sidewall of a tire of average size situated for cure in mold cavity MC. It is to be appreciated that more or fewer load pads 50 may be employed under various press sizes and design circumstances which might arise.

Atop insulation set 55 is a lower bolster, generally indicated by the numeral 60. The lower bolster 60 in conventional fashion effects the function of structurally isolating the lower mold section L and of facilitating attachment of the load pads 50 as by bolts 61 which extend through the lower bolster 60, load pads 50, and into the bottom load plates 40. The lower bolsters 60 in engaging the load pads 50 also serve to transmit and distribute loading forces supplied from the bottom load plates 40. Mounted atop the lower bolsters 60 are lower platens 65 which serve as a support for the lower mold section L. The lower platens 65 define a heat transfer surface for seating the lower mold section L and are provided with internal apertures 66 for the circulation of heating fluid which may be supplied through conduits 67. The lower platens 65 are attached in conventional fashion to the lower bolsters 60 as by a series of cap screws 68, as best seen in FIG. 3. The lower mold section L may be attached to the lower platen 65 as by screws (not shown) in similarly conventional fashion.

Still referring to FIG. 3 of the drawings, each mold cavity MC has in addition to a lower mold section L an upper mold section U reposing thereon. Although a two-part mold having a lower mold section L and an upper mold section U are depicted herein, it will be appreciated by persons skilled in the art that a wide variety of known mold configurations could be employed in the mold cavity MC of the curing press 20.

This includes sectional mold configurations and the necessary actuating devices therefor.

The upper mold section U is positioned and supported in much the same manner as the lower mold section L, only in inverted orientation. Overlying the upper mold section U is an upper platen 70 which serves as a support. The upper platen 70 also defines a heat transfer surface for seating the upper mold section U and is provided with internal apertures 71 for the circulation of heating fluid which may be circulated therethrough as by conduits 72. Overlying the platen 70 is an upper bolster 75 which in a manner similar to lower bolster 60 effects the function of structurally isolating the upper mold section U and suspending it as by screws 76. The upper bolster 75 may also be provided with screws 77 which extend therethrough into the upper platen 70 for supporting it and maintaining it in engagement therewith. Positioned upwardly of the upper bolster 75 are a plurality of upper load pads 80 which may be of substantially identical construction to the load pads 50. In a manner similar to load pads 50, the load pads 80 may have an insulation set 81 of the same axial height positioned radially inwardly and outwardly thereof such as to fully overlie and thermally insulate the upper bolster 75 across its radial extent. As seen in FIG. 2, there are six load pads 80 which are positioned at substantially the same radial dimension with respect to the mold cavity MC as the load pads 50 and circumferentially equiangularly spaced. Again, more or fewer load pads 80 could be provided depending upon a particular press configuration and related design requirements.

The load pads 80 are affixed to an adjusting screw flange which includes a rib plate 85 as by bolts 86 which extend through the load pads 80 and are anchored in the upper bolster 75. The rib plates 85 are rigidly attached to a generally cylindrical adjusting screw 87 which is an enlarged cylinder member that may have internal disc plate 88. The adjusting screw 87 has external threads 89 for a purpose hereinafter described. Adjustably interengaging the cylindrical adjusting screw 87 is an adjusting nut 90 which is rotatably mounted. The adjusting nut 90 has internal threads 91 which engage the external threads 89 of the adjusting screw 87. The adjusting nut 90 relatively non-rotatably mounts a sprocket 92 preferably proximate the upper axial extremity of adjusting nut 90 thereof. The sprocket 92 engages a drive chain 93 which is also in engagement with the drive sprocket 94 of a gear motor 95 which is attached to a motor mounting bracket 96.

It will thus be appreciated that actuation of gear motor 95 effects rotation of drive sprocket 94 so that the drive chain 93 effects rotation of the adjusting nut 90 to thus move the adjusting screw 87 vertically in an upward or downward direction, depending upon the direction of drive of the motor 95. The vertical positioning of the adjusting screw 87 provides an adjustment for the mold height of various molds which might be employed in the curing press 20. As depicted in FIG. 3 of the drawings, the adjusting screw 87, and thus the upper mold U, is shown in the lowermost position in the right-hand side of the figure to accommodate the lowest permissible mold height. In the left-hand side of FIG. 3, the adjusting screw 87 is shown in its vertically uppermost position to accommodate a maximum permissible mold height, with intermediate positions for particular molds being accommodated by actuation of motor 95 for effecting the desired extent of travel of adjusting screw 87 in the appropriate direction.

In order to provide for movement of the adjusting screw 87 relative to the adjusting nut 90, the adjusting nut 90 is affixed to a load shell assembly 110. The principal support and strengthening member for all structure associated with and supporting the upper mold section U, as seen in FIGS. 1, 2, and 3, is a cross beam assembly 100, which includes a pair of spaced, generally T-shaped face plates 101 which are positioned essentially equidistant to the front and back of the centerlines of the mold cavities MC of the press 20. The face plates 101 are spaced and joined into a rigid structural configuration by a plurality of cross beams 102 and 103 (see FIG. 2). An annular support plate 104 of the load shell assembly 110 may be attached to the underside of the face plates 101 as by a plurality of bolts 105. The support plate 104 of load shell assembly 110 mounts the adjusting nut 90 (FIG. 3) and may conveniently serve as an anchor point to which the motor mounting bracket 96 is attached as by cap screws 97.

Load shell assembly 110 has an outer cylindrical cover 111 which is of significant rigidity and which is attached to the support plate 104 as by a weld 112. The cover 111 is of sufficient vertical extent such that it radially outwardly encompasses the adjusting screw 87 and the load pads 80, bolster 75, platen 70, and upper mold section U. The cover 111 terminates axially downwardly in a reinforcing ring 115 which may be attached as by welds 116. Positioned inwardly of the cover 111 of load shell assembly 110 and reinforcing ring 115 is a cylindrical insulation wrap 113 which primarily controls heat loss radially of the mold cavities MC. As shown, the reinforcing ring 115 extends downwardly a sufficient distance such as to be in proximity to but spaced a distance from the annular reinforcing rail 45 attached to bottom load plate 40 when the press 20 is closed, as depicted in FIGS. 1 and 3 of the drawings. At the closed position, the insulation wrap 113 may contact the insulation set 46 reposing radially inwardly of annular reinforcing rail 45. It will thus be appreciated that the mold sections L, U and mold support components positioned between bottom load plate 40 and support plate 104 are radially outwardly surrounded by insulation to thereby minimize the escape of heat radially of press 20.

Interconnecting the load shell assembly 110 and the bottom load plate 40 is a mold locking and clamping assembly, generally indicated by the numeral 120. As seen in FIGS. 1-3 and 5 of the drawings, the reinforcing ring 115 extends a distance radially outwardly of the cover 111 of load shell assembly 110. Further, the annular plate 41 of bottom load plate 40 also extends radially outwardly of the mold cavity MC to a radial extent such as to underlie the reinforcing ring 115.

Figure 4:
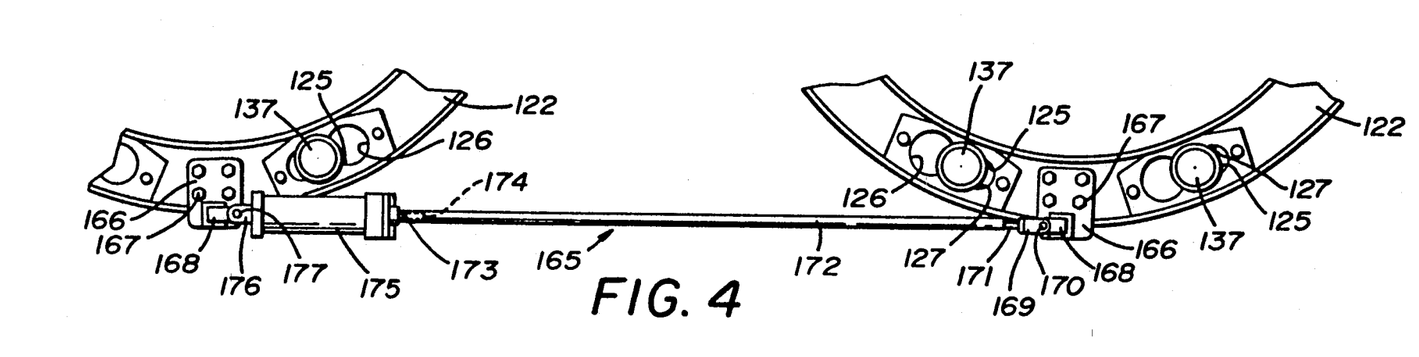
FIG. 4 is a fragmentary top plan view taken at the rear of the press of FIG. 1 showing the lock ring actuating assembly extending between the lock ring mechanisms of the two adjacent press cavities.
Figure 5:
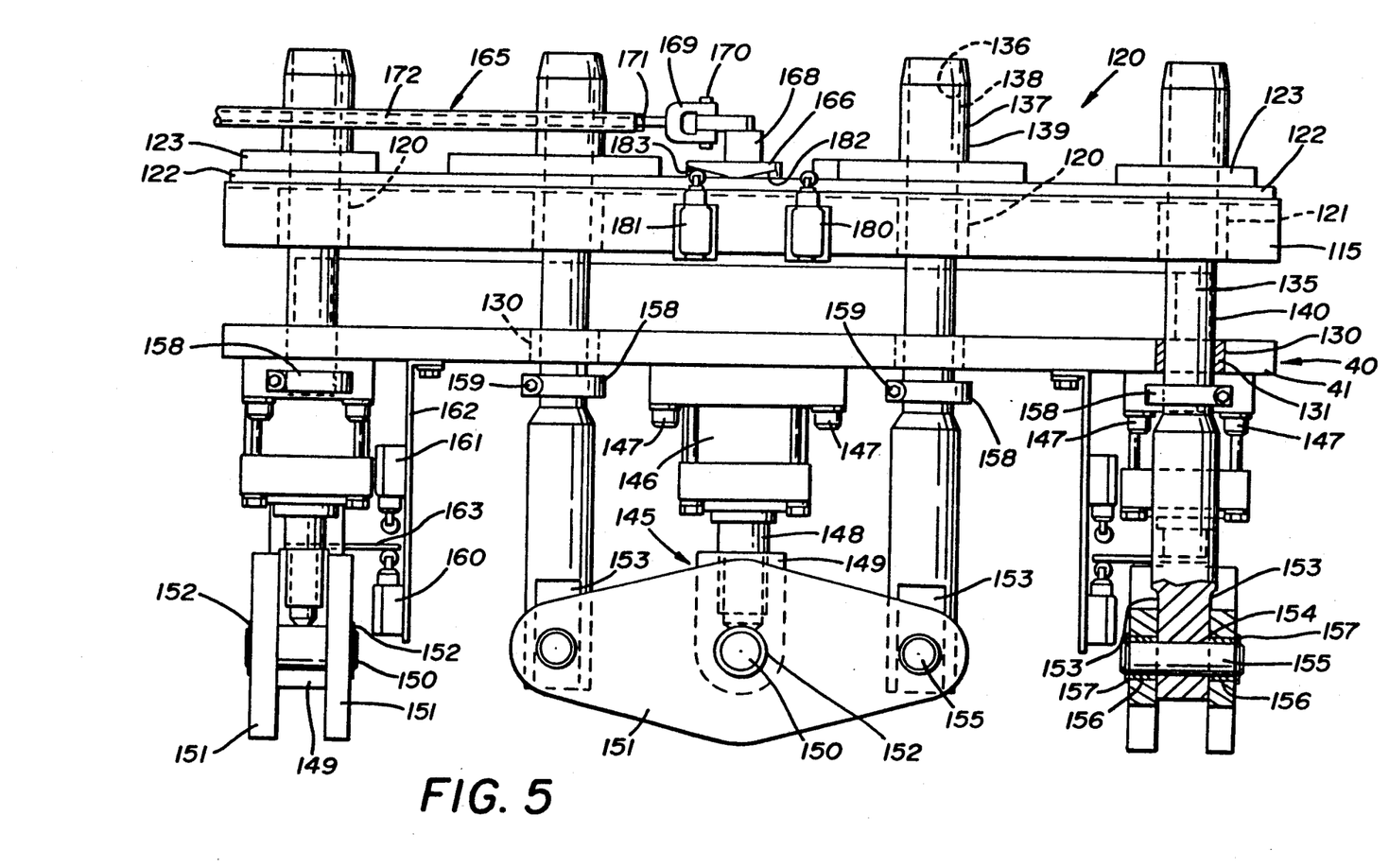
FIG. 5 is a fragmentary rear elevational view of the press of FIG. 1 showing details of the press locking and mold clamping assembly and particularly the mold squeeze assembly and a portion of the lock ring actuating assembly.

The reinforcing ring 115 and annular plate 41 are selectively interconnected by the mold locking and clamping assembly 120. To this end, the reinforcing ring 115 is provided with a plurality of bores 121, which are preferably substantially equiangularly spaced about the circumference of reinforcing ring 115. As shown, eight of the bores 121 are positioned approximately every 45 about the circumference of the reinforcing ring 115. Positioned overlying the reinforcing ring 115 is a lock ring 122 which carries a plurality of lock blocks 123 which overlie the location of each of the bores 121 in the reinforcing ring 115. As shown, lock blocks 123 are attached to the lock ring 122 by cap screws 124; however, the lock ring 122 could integrally incorporate the structure of the lock blocks 123. The lock blocks 123 and the underlying portion of the lock ring 122 have a keyhole slot 125 best seen in FIG. 4. As seen in FIG. 4, keyhole slot 125 has a circular bore 126 which is substantially the same diameter as the bore 121 in reinforcing ring 115. The keyhole slots 125 also have an elongate arcuate portion 127 (see FIGS. 2 and 4) which are of a lesser radial extent than the diameter of bores 126 and 121. Underlying and co-axially aligned with the bores 121 in reinforcing ring 115 are bores 130 in annular plate 41 of the bottom load plate 40. The bores 130 may be provided with a bushing 131, as seen in FIGS. 3 and 5. Extending through each of the bores 130 of annular plate 41 and through the bore 121 of reinforcing ring 115 and the keyhole slot 125 in lock ring 122 and lock blocks 123, when the press 20 is in the closed position depicted in FIGS. 1, 3, and 5, are connecting rods 135. The upper extremity of connecting rods 135 have threads 136 for mounting squeeze nuts 137 which have internal threads 138 for engagement with the threads 136. The outer diameter 139 of the squeeze nut 137 is of a diameter slightly less than the diameter of the circular bore 126 in the keyhole slot 125 but substantially greater than the radial dimension of the elongate arcuate portion 127 of keyhole slot 125 for reasons which will become apparent hereinafter. It is to be noted, however, that the diameter of the shank 140 of connecting rod 135 is less than the radial extent of the elongate arcuate portion 127 of keyhole slots 125 in lock ring 122 and lock blocks 123.

The connecting rods 135 are supported and axially moved by a connecting rod actuating assembly, generally indicated by the numeral 145, of the mold locking and clamping assembly 120. The connecting rod actuating assembly 145 has a fluid actuator 146 which may be a hydraulic cylinder of relatively large bore and relatively short stroke. The fluid actuator 146 may conveniently be mounted to the underside of annular plate 41 of bottom load plate 40, as by cap screws 147, in an open, accessible location highly convenient for maintenance and/or replacement. The fluid actuator 146 has an extending cylinder rod 148 to which a rod eye 149 is rigidly attached, as best seen in the middle and left-hand portion of FIG. 5. The rod eye 149 is bored to receive pivot pin 150. The pivot pin 150 mounts to either side of the rod eye 149 a connecting link 151, which may be held in place on pivot pin 150 by retainer rings 152.

The connecting links 151 are generally elongate, and the fluid actuator 146 is positioned such that each of the two lateral extremities of connecting link 151 terminate proximate the lower extremities of two adjacent connecting rods 135. The lower extremities of the connecting rods 135 may preferably have diametrically opposed flats 153, as best seen in the middle and right-hand portion of FIG. 5, proximate to which the connecting links 151 are positioned. In a manner similar to the attachment of connecting links 151 with the rod eye 149, the connecting rod 135 has a bore 154 which seats a connecting rod pin 155. The lateral extremities of the connecting link 151 have bores 156 for receiving the pin 155 to either side of the flats 153 of connecting rod 135. In a manner similar to pivot pin 150, the connecting rod pin 155 may have retainer rings 157 positioned at the extremities of connecting rod pin 155 outwardly of the connecting links 151. As will be appreciated, the actuation of the fluid actuator 146 will serve to axially simultaneously extend and retract each of the two connecting rods 135 to which each cylinder is attached by a pair of connecting links 151. It will be appreciated that with the use of the pair of spaced, parallel connecting links 151 disposed to either side of the rod eye 149 and connecting rods 135, equalized symmetric loading of connecting rods 135 is effected.

The connecting rods 135 are moved axially downwardly, as viewed in FIG. 5, when the fluid actuator 146 is supplied with pressurized fluid. This axially downward movement of connecting rods 135 brings the squeeze nuts 137 into engagement with the upper surface of the lock blocks 123 to either side of the elongate arcuate portion 127 of keyhole slot 125. In this manner, squeezing force is applied to the reinforcing ring 115 and the annular plate 41 of bottom load plate 40 due to the positioning of fluid actuator 146. In the case of bottom load plate 40, the squeeze force is transferred to the load pads 50 reposing thereon and preferably equiangularly spaced therebetween and distributed via the bolster 60 and platen 65 to the lower mold section L. The annular reinforcing rail 45 can be seen to provide additional rigidity to the bottom load plate 40 between the bore 130 and the load pads 50. The squeeze force applied to the reinforcing ring 115 is transferred through the outer cylindrical cover 111 to the support plate 104, through the adjusting nut 90 to cylindrical adjusting screw 87 to rib plates 85, and thence via the upper load pads 80, upper bolster 75, and upper platen 70 to the upper mold section U.

The squeeze forces effected by the mold locking and clamping assembly 120 are released by actuation of the fluid actuator 146 to retract the cylinder rod 148 and thus move the connecting link 151 and attached connecting rods 135 upwardly, as viewed in FIG. 5. The connecting rods 135 are moved upwardly a distance, which is just sufficient such that the squeeze nuts 137 move out of engagement with the lock blocks 123, preferably with a slight clearance therebetween. Rather than relying upon the extent of travel of fluid actuator 146 to control the requisite clearance and to insure uniform axially upward displacement of each pair of connecting rods 135, the shank 140 of each connecting rod 135 may be provided with a stop collar 158. The stop collars 158 may be adjustably positioned axially of connecting rods 135 as by a cap screw 159, which may be loosened to effect movement of the collar 158 relative to shank 140 of connecting rod 135 and tightened to effect gripping engagement of the shank 140 by stop collars 158.

If desired, provision may be made for providing positive assurance that the connecting rods 135 move fully from the extended to the retracted positions each time the fluid actuator 146 is energized. In this respect, a pair of limit switches 160, 161 may be installed on a limit switch mounting plate 162. A limit switch actuator 163 may be affixed to the top of rod eye 149 of cylinder rod 148. The limit switches 160, 161 are located and spaced a distance representing the position of the connecting rods 135 in the fully axially downward position during the mold squeeze operation and the fully axially upward position with the stop collars 158 engaging the underside of annular plate 41 of bottom load plate 40. As seen in FIG. 5, the mold locking and clamping assembly 120 is in the squeeze position, with the limit switch actuator 163 engaging the limit switch 160. With the connecting rods 135 moved axially vertically upwardly and stop collars 158 engaging annular plates 41, the limit switch actuator 163 would be in engagement with limit switch 161.

The mold locking and clamping assembly 120 also includes a lock ring actuating assembly, generally indicated by the numeral 165. The lock ring actuating assembly 165, as best seen in FIGS. 4 and 5, may conveniently be disposed to the rear of the curing press 20 and joins the lock rings 122 of adjacent mold cavities MC of the dual press 20. Each lock ring 122 is provided, preferably at the radial rearward extremity thereof, with a mounting plate 166 which may be affixed on the lock rings 122 as by cap screws 167. The mounting plates 166 each have an attached cylinder mount 168. One of the cylinder mounts 168 receives a clevis 169, which is attached thereto as by a pin 170. The clevis 169 may carry a threaded connector 171 which engages one end of an actuating rod 172. The effective length of the rod 172 can thus be varied by the extent to which connector 171 is threaded into actuating rod 172. The end of actuating rod 172 opposite the threaded connector 171 is attached as by a pin 173 to a piston rod 174 of a fluid actuated cylinder 175. The end of cylinder 175 opposite the piston rod 174 has tabs 176 which are bored to receive a pin 177 affixed to a bore (not shown) in the cylinder mount 168.

As shown in FIG. 4, the lock ring 122 is positioned over the elongate arcuate portion 127 of keyhole slot 125 in lock blocks 123 and lock ring 122. It will be appreciated that in the depicted position, the press 20 is in locked condition in that the squeeze nuts 137 and associated connecting rods 135 with the stop collars 158 preclude the reinforcing ring 115 from moving upwardly more than a short clearance distance. This keeps the press 20 from opening even in the event of a loss of pressure to fluid actuators 146 or other malfunction. When the cylinder 175 is actuated to extend the piston rod 174, it will be noted that the lock ring 122 proximate to cylinder 175 will be rotated clockwise, while the other lock ring 122 will be rotated in a counterclockwise direction, in each instance the rotation of lock rings 122, 122 serving to bring the circular bore 126 of the keyhole slot 125 in lock blocks 123 and lock ring 122 into concentricity with the squeeze nuts 137 atop connecting rods 135. With the squeeze nuts 137 having an outer diameter 139 slightly less than the diameter of the circular bores 126 and bore 121 of the reinforcing ring 115, it will be apparent that the reinforcing ring 115 can be moved upwardly relative to the squeeze nuts 137 to effect opening of the press 20 as hereinafter described.

If desired, provision may be made for providing positive assurance that the lock rings 122 are in the fully locked position depicted in FIG. 4 of the drawings or the fully unlocked position as aforedescribed. In this respect, a pair of limit switches 180, 181 may be affixed on the radially outward surface of the reinforcing ring 115 proximate to each of the mounting plates 166 of lock ring actuating assembly 165. As best seen in FIGS. 4 and 5, the mounting plates 166 may extend slightly beyond the axial outer extremity of the lock ring 122 and be provided with a pair of spaced cam surfaces 182 and 183 positioned on the underside thereof for selective engagement with the limit switches 180, 181, respectively. When the lock ring 122 is in the locked position depicted in FIG. 5 of the drawings, the limit switch 181 is actuated by cam surface 183 of mounting plate 166. Upon actuation of cylinder 175 to effect extension of piston rod 174 to rotate lock rings 122 to the unlocked position, the mounting plate 166 seen in FIG. 5 would be rotationally displaced to the right a sufficient extent such that cam surface 182 would engage limit switch 180, thereby signaling that lock ring 122 has fully rotated to the unlocked position so that the press 20 could be opened without interference between the squeeze nuts 137 and the components of reinforcing ring 115.

The aforedescribed movement of the cross beam assembly 100 to produce controlled relative movement of the upper mold sections U of the curing press 20 relative to the lower mold sections L is effected by a vertical guide assembly, generally indicated by the numeral 200. As shown, particularly in FIG. 1, the vertical guide assembly 200 is a laterally compact, generally upright structure which is advantageously centered and aligned between the centerlines of the mold cavities MC of the dual curing press 20.

The vertical guide assembly 200 has a center post assembly, generally indicated by the numeral 201. The center post assembly 201 is of a generally hollow rectangular configuration having a pair of front beams 202 (see FIG. 1) and a pair of rear beams 203 (see FIG. 9), which extend a distance substantially vertically upright. The front beams 202, 202 are spaced and joined over a portion of their length by a front plate 204, while the rear beams 203, 203 are similarly spaced and joined over a portion of their length by a rear plate 205. The right side front beam 202 is connected to the right side rear beam 203 by a side plate 206, while the left front beam 202 is connected to the left rear beam 203 over a portion of their length by a left side plate 207. The center post assembly 201 thus has its longer rectangular dimension extending from the front to the rear of the press 20.

If desired, the center post assembly 201 may be readily integrated into the framework 21 and particularly the base assemblies 22 and 23 as by extending the cross braces 26 and 27 and connecting them to upper and lower attachment brackets 208 and 209, respectively, which may be suitably affixed as by cap screws 210 at spaced vertical positions along the center post assembly 201 and particularly beams 202, 203 thereof. The center post assembly 201 may thus be attached as an integral portion of the framework 21 of the press 20. In order to withstand the substantial loads carried by the center post assembly 201, the lower extremity of the beams 202, 203 may mount a foot plate 212, which may be similar to the pads 28 of the corner struts 25.

Figure 9:
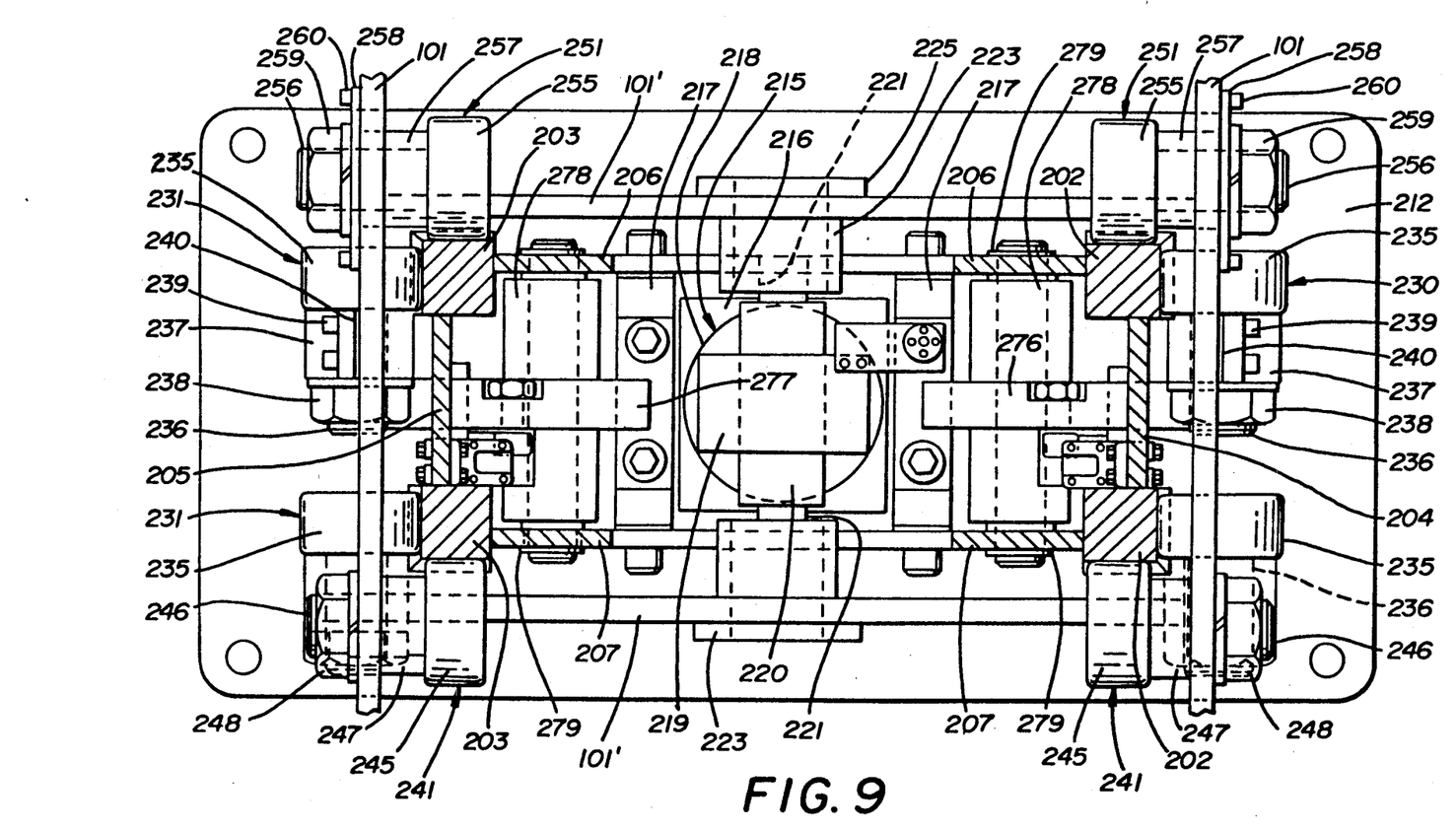
FIG. 9 is an enlarged top plan view of the center post assembly showing particularly the vertical guide mechanism for effecting precision movement of the cross beam assembly relative to the center post assembly.
Figure 10:
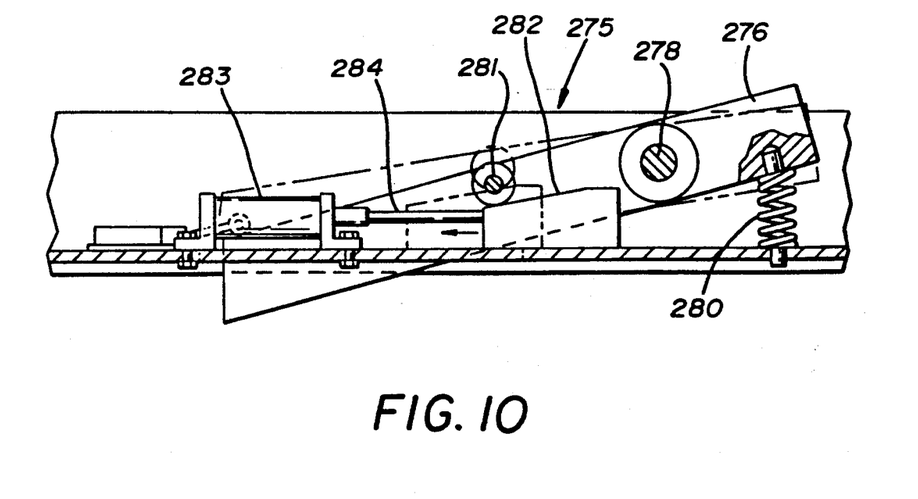
FIG. 10 is an enlarged fragmentary cross-sectional view of the cross beam assembly locking mechanism taken substantially along the line 10-10 of FIG. 6.

The vertical guide assembly 200 has a lift mechanism, generally indicated by the numeral 215, which interconnects and powers the movement of the cross beam assembly 100 relative to the center post assembly 201. Referring now to FIGS. 1 and 9 of the drawings, the power supply member of lift mechanism 215 is a hydraulic cylinder 216 which is located interiorly of and preferably centered within the center post assembly 201, i.e., located centrally of the rectangular framework formed by the beams 202, 203. As shown, the cylinder 216 may be mounted on cross braces 217 attached between side plates 206 and 207.

Figure 6:
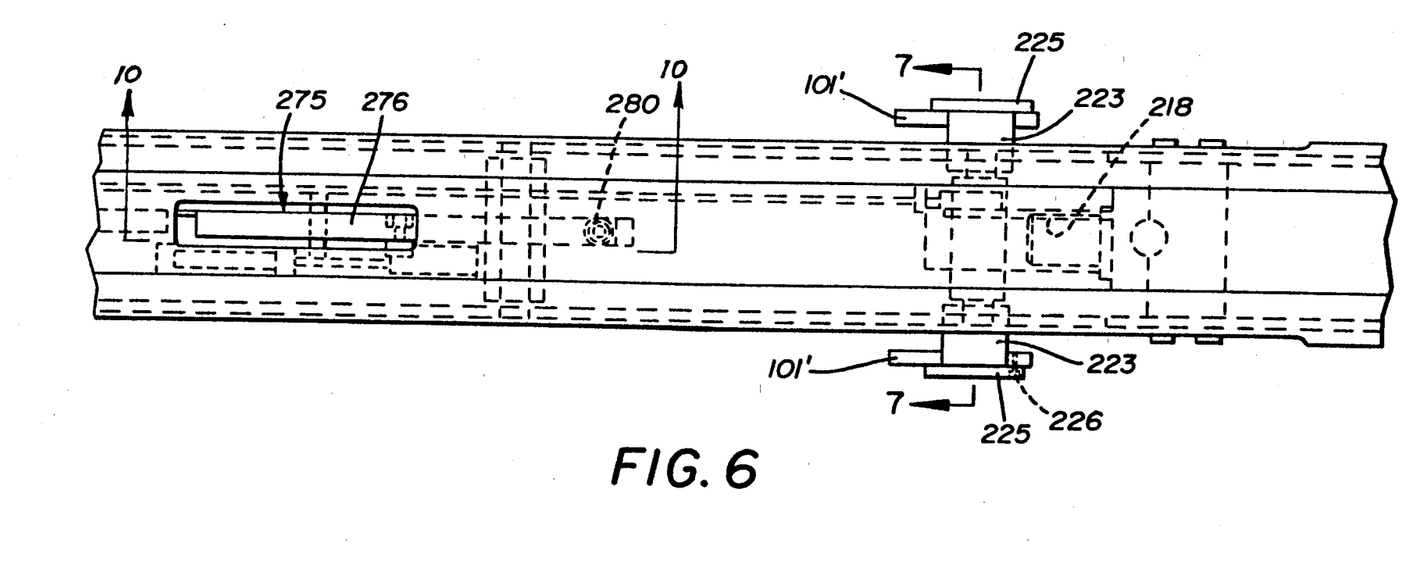
FIG. 6 is an enlarged fragmentary front elevational view of the medial portion of the vertical guide assembly and showing particularly the interconnection between the lift mechanism and the cross beam member.
Figure 7:
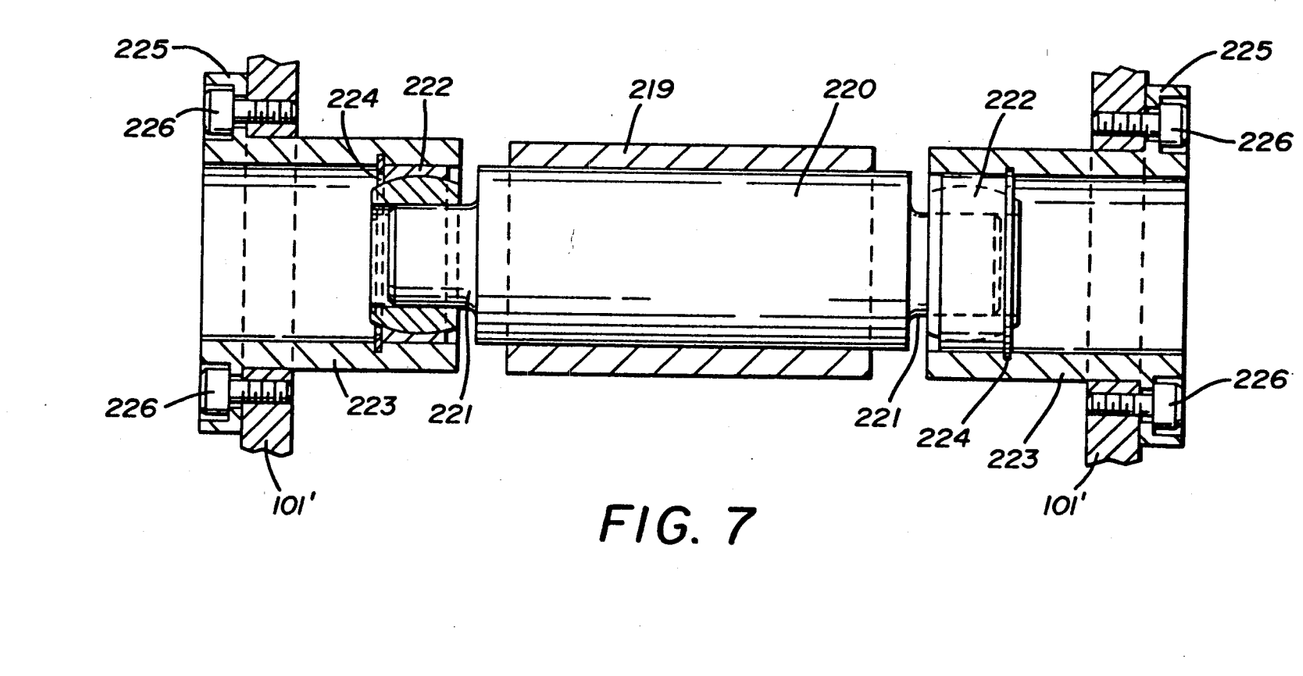
FIG. 7 is an enlarged cross sectional view of the vertical guide assembly taken substantially along the line 7-7 of FIG. 6 and showing details of the interconnection between the lift mechanism and the cross beam member.

As best seen in FIGS. 6–9, inclusive, the cylinder 216 has a piston rod 218 which mounts a rod eye 219 that extends axially upwardly therefrom. The rod eye 219 is bored to receive a laterally extending clevis pin 220. The clevis pin 220 has at each axial extremity thereof reduced diameter extending shafts 221. Each of the shafts 221 are positioned in a spherical bushing 222 laterally to either side of the clevis pin 220. The spherical bushings 222, 222 are each retained in a cylindrical bearing housing 223 as by retaining rings 224. The laterally outward extremity of the bearing housings 223 opposite the portions mounting spherical bushings 222 have annular attachment flanges 225. The housings 223, 223 extend through cross braces 101' of the cross beam assembly 100 and are attached to the front and rear face plates 101, 101, as best seen in FIGS. 1, 7 and 9 of the drawings. The flanges 225 may each be attached to the cross braces 101' by a plurality of cap screws 226 (see FIG. 7). It will thus be appreciated that actuation of the cylinder 216, which is attached to the center post assembly 201 to move piston rod 218, will result in corresponding vertical movement of the entirety of the cross beam assembly 100 hereinabove described.

The cross beam assembly 100 is stabilized and guided relative to center post assembly 201 to effect precision movement of cross beam assembly 100 by a roller guide assembly, generally indicated by the numeral 230. As seen in FIGS. 1 and 9, the roller guide assembly 230 contemplates the positioning of four rollers to each side of the four sides of the center post assembly 201. As best seen in FIG. 1, there are two roller guides, generally indicated by the numeral 231, in the upper portion of the front face plate 101 positioned in an elongate slot 106 therein. Similar roller guides, generally indicated by the numeral 232 and 232, are positioned in an elongate slot 107 in the lower portion of the T-shaped face plates 101, as best seen in FIG. 1. Each of the four front roller guides 231, 231, 232 and 232 on the front face plate 101 may be of identical structural configuration. As seen in FIGS. 1 and 9, the roller guides 231, 232 have a roller 235 rotatably mounted on a shaft 236, which is axially positioned by a spacer 237 and affixed by a locknut 238. The spacer 237 is attached to the front face plate 101 as by a plurality of cap screws 239. The distance which each of the rollers 235 extend laterally inwardly of the front face plate 101 may be adjusted by shims 240 of a suitable number and thickness such as to selectively laterally position the rollers 235.

The arrangement of the portion of roller guide assembly 230 to the rear of center post assembly 201 may be identical to the aforedescribed positioning of roller guides 231 and 232 on front face plate 101 and, therefore, are not detailed herein. It will be observed, however, that FIG. 9 of the drawings shows the rear face plate 101 and the roller guides 231 positioned thereon in operative relation to the rear beams 203, 203. As indicated, these roller guides 231 have a roller 235 rotatably mounted on a shaft 236, which is axially positioned by a spacer 237 and affixed by a locknut 238. These spacers 237 are similarly attached to the rear face plate 101 as by a plurality of cap screws 239. Further, the distance in which each of the rollers 235 extend laterally inwardly of the rear face plate 101 may be adjusted by shims 240 of a suitable number and thickness such as to selectively laterally position the rollers 235.

It will thus be apparent that the adjustment of roller guides 231 and 232 to the front and rear of center post assembly 201 permits accurate front-to-back location of cross beam assembly 100 relative to the center post assembly 201, as well as minute adjustment by use of shims 240 to place the four front rollers 235 and the four rear rollers 235 in precise engagement with the front beams 202 and rear beams 203 such that a low friction rolling engagement without excess free motion can be achieved by suitable adjustment. It is also to be appreciated that judicious employment of shims 240 can also be employed to compensate for wear which may result from usage of the curing press 20 over extended time periods. The substantial vertical spacing of roller guides 231 and 232 is also significant in achieving precise alignment and stability of the cross beam assembly 100 relative to center post assembly 201 in a front-to-rear direction of press 20. It will further be appreciated by persons skilled in the art that the outer surfaces of front beams 202 and rear beams 203 engaged by the rollers 235 may be machined to provide precise, smooth engagement surfaces.

The arrangement of roller guide assembly components to the left side and to the right side of center post assembly 201, as viewed in FIG. 1 of the drawings, contemplates four roller guides, generally indicated by the numeral 241, to the left-hand side of center post assembly 201. Configured similarly to roller guides 231, 232, the roller guides 241, as best seen in FIGS. 1 and 9, have a roller 245 rotatably mounted on a shaft 246 which is seated in a roller support housing 247. The shaft 246, in each instance, extends through a bore in front face plate 101 or rear face plate 101 and is rigidly secured in place relative to the face plates 101, 101 as by a locknut 248. Thus, the roller guides 241 to the left side of center post assembly 201 are mounted in a fixed position for engagement with the left side of front beam 202 and rear beam 203.

The four rollers to the right side of center post assembly 201 are basically similarly configured but differently mounted. The four right side roller guides are generally indicated by the numeral 251, as best seen in FIGS. 1 and 9. Configured similarly to roller guides 241, the roller guides 251 have a roller 255 rotatably mounted on a shaft 256, which is seated in a roller support housing 257. The shaft 256, in each instance, extends through a bore in front face plate 101 or rear face plate 101 and is secured in place in an eccentric housing 258 by a locknut 259. Each eccentric housing 258 is attached to a face plate 101, 101 as by cap screws 260. The eccentric housing 258 has an offset bore, which bore is displayed laterally from side to side, depending upon rotation and the resultant mounting holes employed for attachment of eccentric housing 258 by the cap screws 260. It is, thus, to be appreciated that the position of each of the four roller guides 251 can be varied laterally from right to left for placing the rollers 245 and 255 in precise alignment with the front beams 202 and the rear beams 203 such that a low friction rolling engagement without excess free motion can be achieved by suitable adjustment. In a manner similar to roller guides 231, 232, the substantial vertical spacing of one pair of each of roller guides 241 and roller guides 251 relative to the other pair of roller guides 241 and the other pair of roller guides 251 is significant in achieving precise alignment and stability of cross beam assembly 100 relative to center post assembly 201 in a lateral or side-to-side direction. Also, it is to be appreciated that the surfaces of front beams 202 and rear beams 203 engaged by rollers 245 and 255 is machined to provide precise, smooth engagement surfaces.

From the preceding description, it will be seen that the roller guide assembly 230 provides bidirectional stabilization and guidance of the cross beam assembly 100 over its full extent of vertical movement relative to center post assembly 201. This precise controlled positioning of the cross beam assembly 100 and attached components is significant in effecting repeated precise registry between the upper mold sections U and lower mold sections L in the mold cavities MC of the curing press 20.

Figure 8:
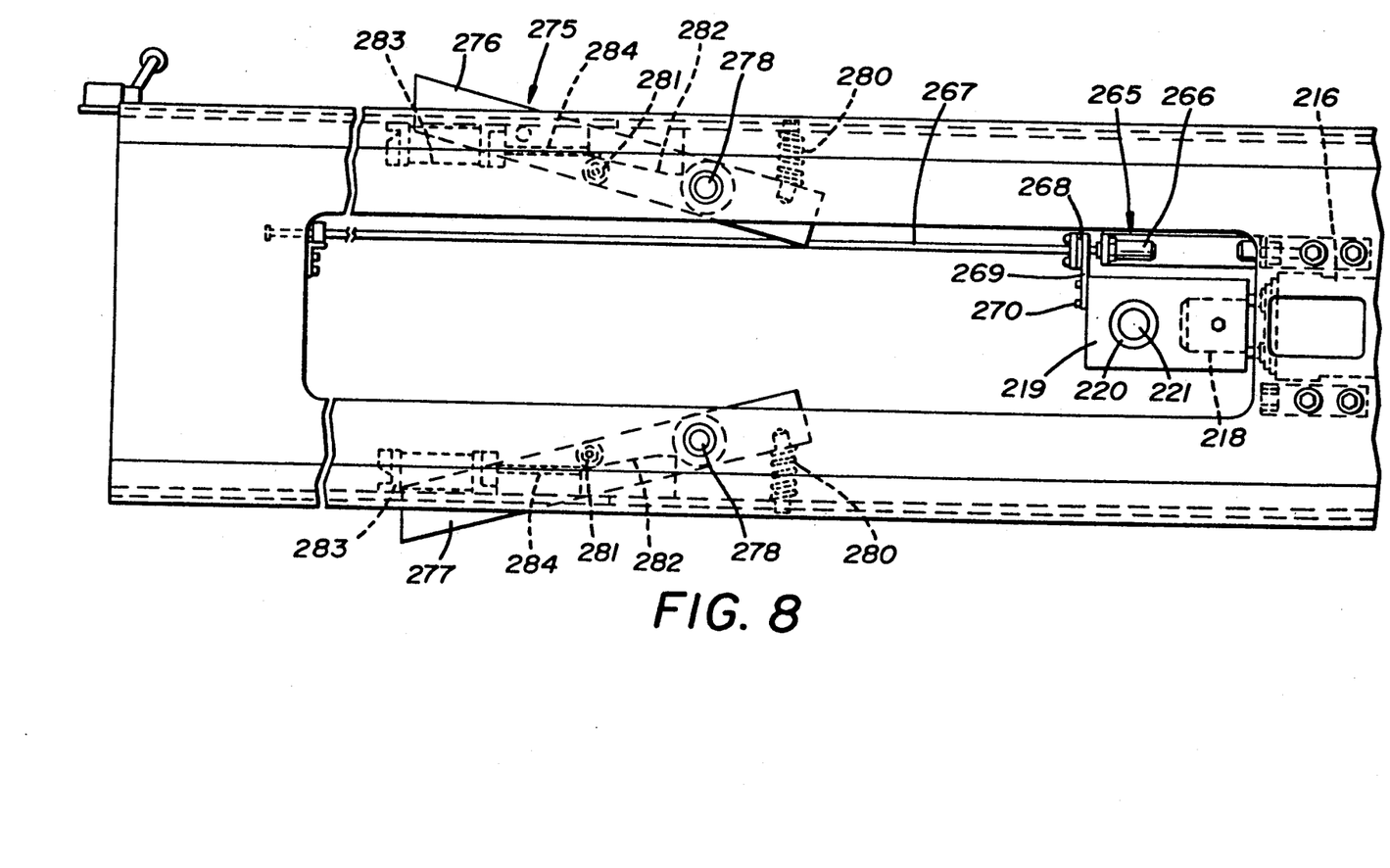
FIG. 8 is an enlarged fragmentary side elevational view of an upper portion of the center guide assembly showing the cross beam assembly locking mechanism.

The vertical position of cross beam assembly 100 relative to center post assembly 201 may be advantageously monitored by a cross beam position indicator mechanism, generally indicated by the numeral 265, as shown particularly in FIGS. 6 and 8. The cross beam position indicator 265 is preferably positioned within center post assembly 201 and includes as a principal component thereof the linear position transducer 266. The transducer 266 is preferably mounted in close proximity to but spaced from the hydraulic cylinder 216 of lift mechanism 215 and in the vicinity of the rod eye 219. As best seen in FIG. 8, the transducer 266 has a rod 267 extending vertically of the center post assembly 201 from the transducer 266 to a vertically remote position. A transducer magnet 268 is mounted on a plate 269 which is attached as by cap screws 270 to the axial upper extremity of rod eye 219. It is, thus, to be appreciated that the transducer magnet 268 moves along rod 267 as the piston rod 218 of hydraulic cylinder 216 is extended and retracted to effect opening and closing of the curing press 20.

As will be appreciated by persons skilled in the art, the linear position transducer 266 provides signals indicating the position of the magnet 268 at various locations during the course of the travel of the rod eye 219 and cross beam assembly 100 carried thereby. This capability of ascertaining the position of cross beam assembly 100 at selected locations can advantageously be employed to control the stopping, starting, and rate of travel of rod eye 219 and, thus, cross beam assembly 100, as it may be influenced by the controlled ingress and egress of hydraulic actuating fluid to cylinder 216. It will be appreciated that other types of positioning sensors, such as limit switches, could be employed to effect the control functions contemplated by the cross beam position indicator mechanism 265.

The position of cross beam assembly 100 is at all times controlled by the lift mechanism 215 during normal operation of the curing press 20. However, due to the possibility of the loss of or reduction in pressure to the cylinder 216 of lift mechanism 215 while the press 20 is in the open position, provision is desirably made to prevent accidental uncontrolled descent of the cross beam assembly 100. In this respect, it is to be noted that the press 20 is cycled to the open position during the curing of each tire for purposes of unloading a cured tire and inserting an uncured tire employing loading and unloading apparatus, for effecting a change of the mold sections U, L, and for carrying out various types of maintenance with respect to the curing press 20. The possible accidental uncontrolled descent of cross beam assembly 100 is countered by a safety stop mechanism, generally indicated by the numeral 275, as best seen in FIGS. 6 and 8 of the drawings.

The safety stop mechanism 275 consists of a pair of stop bars 276 and 277 positioned to the front and rear of the center post assembly 201. The stop bars 276, 277 are elongate members which are each mounted on a pivot pin 278, with the pivot pins extending between the side plates 206 and 207 and affixed therein as by retaining rings 279. The stop bars 276, 277 are pivotable between an extended position depicted in FIGS. 8 and 9 of the drawings and a retracted position wherein they lie laterally interiorly of the front face plate 101 and rear face plate 101. In the extended position, the stop bars 276, 277 underlie the face plates 101, 101 when the press 20 is in the open position to preclude accidental closure as aforedescribed. The stop bars 276, 277 are normally biased to the extended position by a compression spring 280 interposed between the stop bars 276, 277 and the front plate 204 and rear plate 205 of center post assembly 201, as best seen in FIG. 8 of the drawings. The stop bars 276, 277 also mount a cam pin 281, which engages a cam 282 which is operated by a cylinders 283 affixed to both front plate 204 and rear plate 205 of center post assembly 201. The cams 282 are shown in FIG. 8 in the fully extended position of the piston rods 284 of the cylinder 283. The retraction of the piston rods 284 moves the cams 282 vertically, as viewed in FIG. 8, to operate against cam pins 281 and thus effect controlled retraction of the stop bars 276, 277.

It will, thus, be apparent that when the cross beam assembly 100 moves upwardly to the press open position, the stop bars 276, 277 will be automatically mechanically actuated by compression springs 280 to move the stop bars 276, 277 to the extended position. Thus, should hydraulic pressure be lost or reduced to the hydraulic cylinder 216 of lift mechanism 215 while the press 20 is open, the cross beam assembly 100 will be restrained from downward movement by stop bars 276, 277. Prior to the controlled lowering of the cross beam assembly 100 during press closure, the cylinders 283 are actuated as part of the press sequencing to retract piston rods 284 and thereby cams 282 such as to effect the aforedescribed retraction of the stop bars 276, 277, thus permitting the unobstructed lowering of cross beam assembly 100. After the cross beam assembly 100 is lowered below the stop bars 276, 277, the cylinders 283 are actuated to extend piston rods 284 such that the stop bars 276, 277 may retract when the cross beam assembly 100 is subsequently raised and then move the extended position poised for engaging cross beam assembly 100 in the event of unanticipated reduction or loss of hydraulic fluid pressure to hydraulic cylinder 216.

Thus it should be evident that the hydraulic tire curing press disclosed herein carries out the various objects of the invention set forth hereinabove and otherwise constitutes an advantageous contribution to the art. As may be apparent to persons skilled in the art, modifications can be made to the preferred embodiment disclosed herein without departing from the spirit of the invention, the scope of the invention being limited solely by the scope of the attached claims.

I claim:

1. A tire curing press comprising, base assembly means for supporting a lower mold section, cross beam means for supporting an upper mold section, means for vertically moving said cross beam means to open and close the press, mold locking and clamping means for locking the mold sections and for applying squeeze forces to the mold sections when the press is closed and the mold sections are locked for the curing of a tire, said mold locking and clamping means including a bottom load plate associated with said base assembly means, a vertically spaced reinforcing ring associated with said cross beam means and connecting rods selectively interconnecting said load plate and said reinforcing ring for locking the lower mold section and upper mold section, a plurality of vertically aligned bores on said bottom load plate and said reinforcing ring, each receiving one of said connecting rods, and lock ring means overlying and movable relative to said reinforcing ring and having keyhole slots therein for selectively receiving and retaining and connecting rods.

2. A tire curing press according to claim 1, wherein said keyhole slots have a circular bore of substantially the same size as said bores of said reinforcing ring for axially receiving said connecting rods and an enlarged squeeze nut affixed at the upper extremity of said connecting rods.

3. A tire curing press according to claim 2, wherein said keyhole slots have an elongate arcuate portion of a radial extent to receive said connecting rods but of a lesser radial extent than the diameter of said squeeze nuts.

4. A tire curing press according to claim 3, wherein a lock block attached to said lock ring means overlies the proximity of each of said bores of said reinforcing ring and has a keyhole slot of the same dimensions overlying the keyhole slot in said lock ring means.

5. A tire curing press according to claim 3, including lock ring actuating means for selectively rotating said lock ring means to position the circular bore of said keyhole slots of said lock ring means and the arcuate portion of said keyhole slots underlying said squeeze nut.

6. A tire curing press according to claim 5, wherein said lock ring actuating means includes a fluid actuator.

7. A tire curing press according to claim 5, wherein said lock ring actuating means interconnects said lock ring means of a plurality of mold cavities for simultaneous locking and unlocking of a plurality of mold sections mounted in the press.

8. A tire curing press according to claim 5, wherein said connecting rods have stop collars mounted below said bottom load plate to preclude said cross beam means from moving upwardly more than a short incremental distance.

9. A tire curing press according to claim 1, wherein there are eight said connecting rods positioned substantially equiangularly about the periphery of said bottom load plate and said reinforcing ring.

10. A tire curing press comprising, base assembly means for supporting a lower mold section, cross beam means for supporting an upper mold section, means for vertically moving said cross beam means to open and close the press, a bottom load plate associated with said base assembly means, a vertically spaced reinforcing ring associated with said cross beam means, a plurality of vertically aligned bores on said bottom load plate and said reinforcing ring, connecting rods extensible through said aligned bores upon closing of the press, an annular lock ring associated with said reinforcing ring having means for axially receiving said connecting rods in a first position and means for retaining said connecting rods in a second position for locking the mold sections, actuating means for selectively rotationally moving said lock ring between said first position and said second position, and means for axially moving said connecting rods for applying squeeze forces to the mold sections.

11. A tire curing press according to claim 10, wherein a plurality of said connecting rods are positioned substantially equiangularly about the periphery of said bottom load plate and said reinforcing ring.

12. A tire curing press according to claim 11, including a plurality of said means for axially moving said connecting rods, each simultaneously cooperating with two of said connecting rods.

13. A tire curing press according to claim 10, wherein said means for axially receiving said connecting rods is a circular bore and said means for retaining said connecting rods is an elongate slot extending from said circular bore.

14. A tire curing press according to claim 13, wherein said connecting rods have nut means positioned proximate the extremity extensible through said aligned bores of said reinforcing ring having an outer dimension less than said circular bore but greater than said elongate slot.

15. A tire curing press according to claim 10, wherein said means for axially receiving said connecting rods and said means for retaining said connecting rods constitute a keyhold slot.

* * * * *

UNITED STATES PATENT AND TRADEMARK OFFICE
CERTIFICATE OF CORRECTION

PATENT NO. : 5,316,458
DATED : May 31, 1994
INVENTOR(S) : Bernard F. Lesneski

It is certified that error appears in the above-identified patent and that said Letters Patent is hereby corrected as shown below:

Column 16, line 68, "and" should read --said--.

Signed and Sealed this

Nineteenth Day of November, 1996

Attest:

BRUCE LEHMAN

Attesting Officer

Commissioner of Patents and Trademarks